Figure 1:
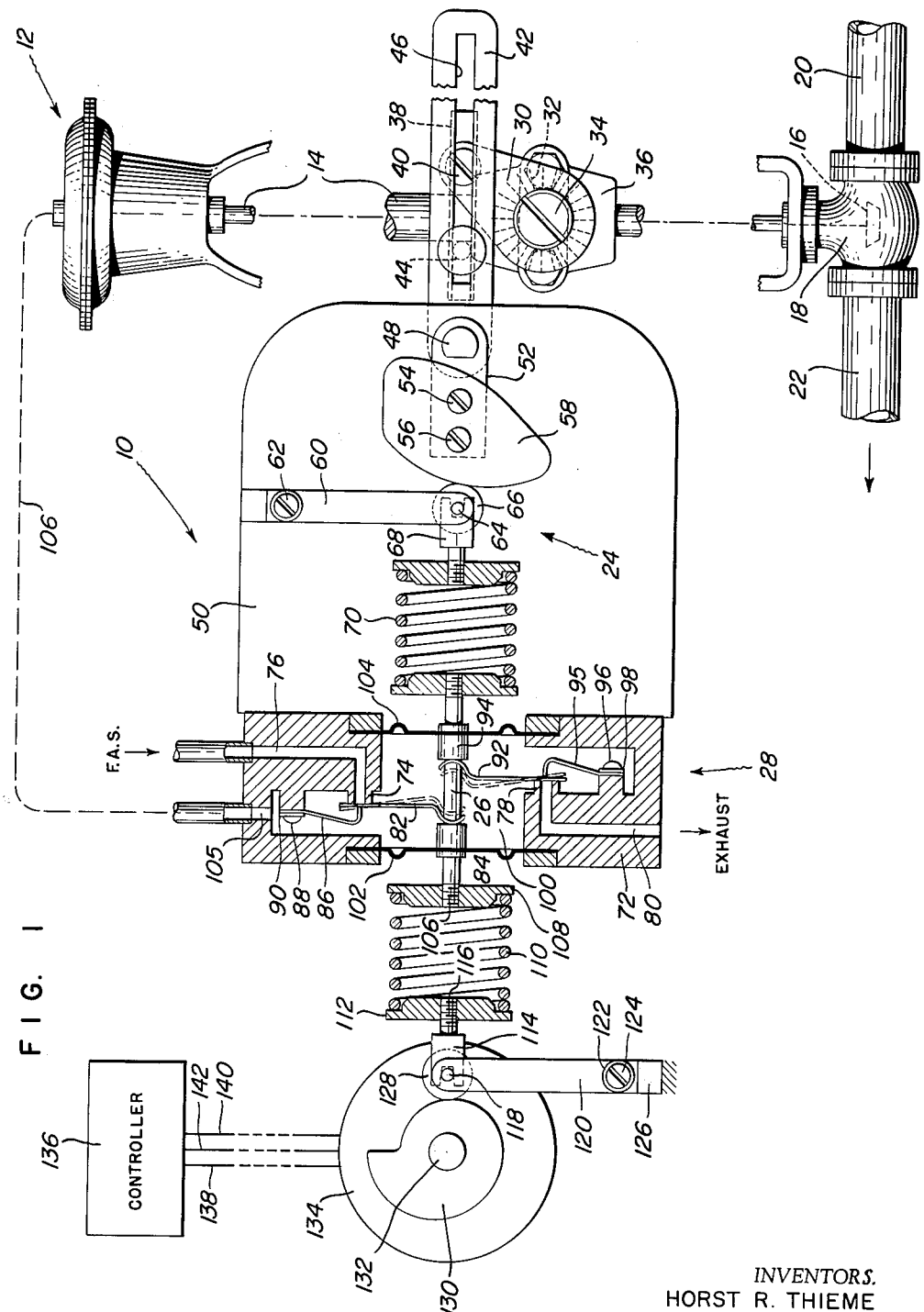

Dec. 14, 1965  H. R. THIEME ET AL  3,222,996
CONTROLLING APPARATUS
Filed March 29, 1963  2 Sheets-Sheet 1

INVENTORS.
HORST R. THIEME
ALBERT E. STONE
BY Arthur H. Swanson
ATTORNEY.

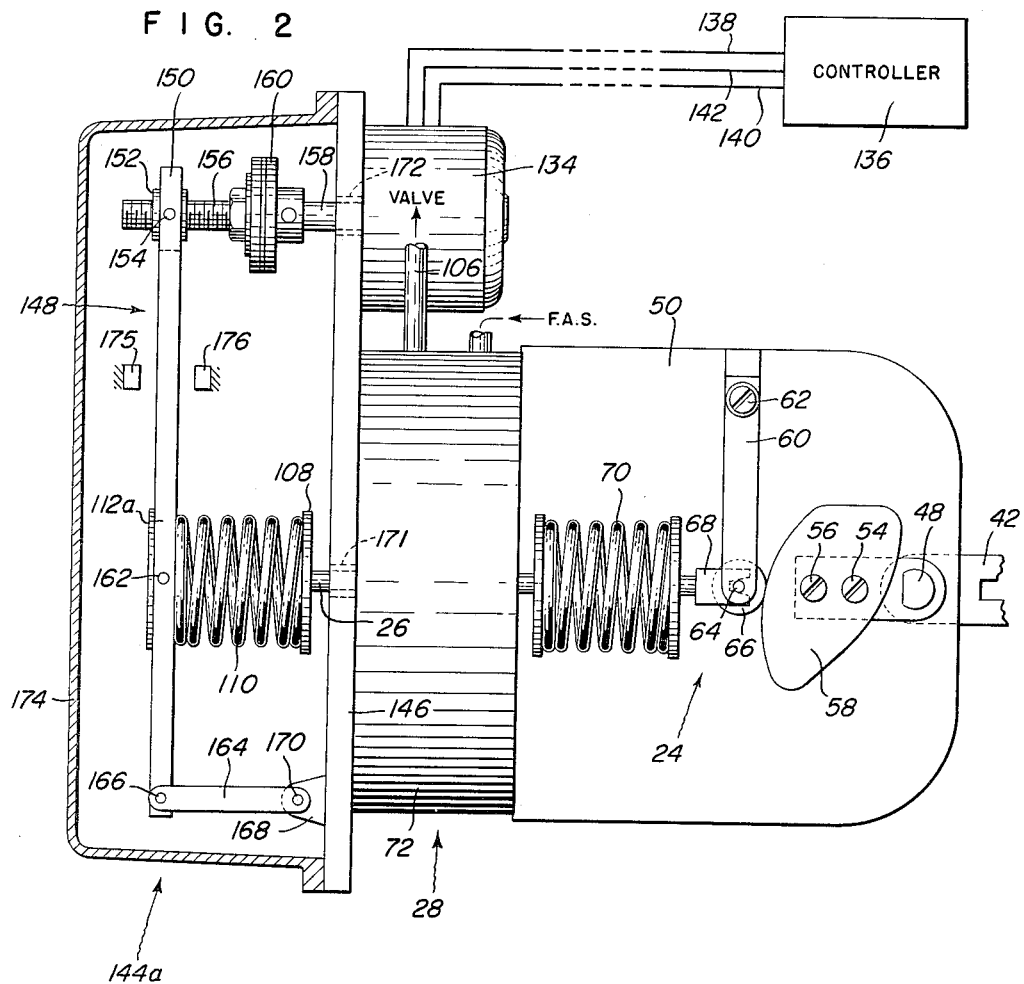

United States Patent Office 3,222,996
Patented Dec. 14, 1965

3,222,996
CONTROLLING APPARATUS
Horst R. Thieme, Ardsley, and Albert E. Stone, Springhouse, Pa., assignors to Honeywell Inc., a corporation of Delaware
Filed Mar. 29, 1963, Ser. No. 269,093
11 Claims. (Cl. 91—382)

It is an object of the present invention to disclose a digital-pneumatic positioner that is useful in moving a control member between any one of a number of different control positions.

More specifically, it is another object of the present invention to disclose a positioner of the aforementioned type to rapidly displace a movable member, for example the stem and plug of a control valve in a flow line, to any one of a number of preselected positions.

It is another object of the invention to provide a pulse-to-motion transducer in the negative feedback structure of a positioner to enable the positioner to move a control member between different predeterminable control positions in accordance with the number of pulses being fed into the transducer.

More specifically, it is another object of the invention to employ a pulse signal receiving stepping motor and a cam and follower unit actuated thereby as the pulse-to-motion transducer in the feedback structure of a digital-pneumatic positioner.

It is another object of the invention to employ a pulse signal receiving stepping motor and linkage actuated thereby as the pulse-to-motion transducer in the feedback structure of still another modified form of the aforementioned digital-pneumatic positioner.

It is an object of the invention to provide a simplified positioner construction of the aforementioned type for readily converting a digital signal into a mechanical motion.

Another object of the present invention is to disclose a digital to analog transducer.

A better understanding of the present invention may be had from the following detailed description, when read in connection with the accompanying drawings in which:

FIG. 1 is a front elevation view of one form of the digital-pneumatic positioner, and FIG. 2 is a front elevation view of another preferred form of the digital-pneumatic positioner.

FIG. 1 of the drawing shows how the digital-pneumatic positioner 10, disclosed herein, can be used with a well-known spring-loaded fluid pressure actuator 12 to alter the position of a control member, such as a stem 14 and plug 16 of a control valve 18, from one control position to another and thereby control the flow of fluid passing in the direction of the arrow through the flow conduits 20, 22.

It should be understood that because of the precise way in which the digital-pneumatic positioner 12 can transmit motion to member 14, the motion of this member can be employed to position many other types of control elements such as pistons, dampeners in air ducts, etc.

FIG. 1 also shows a positive feedback structure 24 extending to the left between the stem 14 and a connecting rod 26 of a fluid pressure regulator in the form of a pilot valve 28.

The negative feedback structure 24 is the same as that disclosed and described in detail in the Horst R. Thieme application, Serial No. 210,624, filed on July 16, 1962. This negative feedback structure is essentially comprised of an angularly-displaceable arm 30 having a radially grooved-out back friction surface 32 fixedly mounted by means of a flat head screw 34 to a block 36 that, in turn, is fixedly connected for motion with the stem 14.

A U-shaped channel member 38 is shown retained in position on the upper surface of the arm 30 by means of a screw connection 40. A link 42 is shown positioned in front of the channel member 38 and having a slidably-fixed pin 44 protruding through a slot 46 in this link 42 whose inner end protrudes into the channel 38.

The left end of the link 42 is mounted for rotation with a pivot shaft 48 that is mounted for rotation on the positioner housing 50.

A cam support plate 52 is fixedly connected at its right end to rotate with the pivot shaft 48. A pair of screw connections 54, 56 are employed to retain a cam 58 in a fixed position on the left end of the plate 52.

A clevis arm 60 is shown pivotally mounted for movement about the center of a bearing support screw 62 at its upper end and is operably connected to the end of a shaft 64 that has a roller 66 rotatably mounted thereon.

The right end of a second clevis 68 is shown in movable engagement with the shaft 64. The left end of the clevis 68 is connected to the connecting rod 26 of the pilot valve 28 by means of the adjustable coil spring connecting means 70.

This pilot valve 28 is comprised of a body member 72 having a regulated air supply nozzle 74 connected by way of an unrestricted air supply passageway 76 to a filtered air source F.A.S. The body member 72 also has an exhaust nozzle 78 connected by way of an unrestricted passageway 80 to atmospheric pressure.

The air supply nozzle 74 is provided with a flapper 82 that has one end pivoted on the outer edge thereof and its other end adjustably fixed for pivoted movement at one end of the hub portion 84 that is attached to the connecting rod 26. The other end of the flapper 82 can be held in either the closed position shown or in any one of a number of dash-line, partially-open, balanced positions one of which is shown in FIG. 1. A curved leaf spring 86 is fixedly connected by means of a screw and washer connection 88, 90 and is shown retaining the flapper in the aforementioned, closed position.

The atmospheric, exhaust type, bleed nozzle 78 is also provided with a flapper 92 that has one end pivoted on the outer edge thereof and its inner end adjustably fixed for pivoted movement at the left end of the hub portion 94 that is attached to the connecting rod 26. The other end of the flapper 92 is shown held in either the closed position shown or in any one of a number of dash-line partially open or balanced positions, one of which is shown in FIG. 1. A leaf spring 95, that is fixedly connected by means of a screw and washer connection 96, 98, is shown retaining the flapper 92 in the closed position.

A chamber 100, defined by the inner wall surface of the pilot valve body member 72 and the diaphragm 102, 104, is connected by way of passageway 105 and a conduit 106 to the head of a fluid pressure actuating member 12.

The outer, peripheral portions of the diaphragms 102, 104 are retainably fixed in position against the respective left and right wall side surfaces of the pilot valve body members 72.

The left end of the connecting rod 26 of the pilot valve is threadedly connected at 107 to one end of an embossed flange 108 which retains the right end of a coil spring 110 in physical engagement therewith. The left end of the coil spring 110 is in physical engagement with another embossed flange 112. The right end of a clevis 114 is shown in threaded engagement at 116 with the flange 112 and having its left end retained in movable engagement with the shaft 118.

A lowermost end of a second clevis arm 120 is shown pivotally mounted for movement about the center of a bearing 122 that is, in turn, retained by means of a screw member 124 on a stationary member 126.

The upper end of the clevis arm 120 is operably connected to the end of the shaft 118 on which there is rotatably mounted a roller 128. The parts 107–128 are identical to the parts that have been previously described that are identified in the drawing as reference numerals 60–70.

A cam 130, fixedly mounted on one end of the shaft 132 of a pulse stepping motor 134, is shown in rolling contact with the roller 128.

A controller 136, which may be located at a remote measuring station, is used to sense the state of the process such as a magnitude of a condition, e.g. the liquid level in a tank. When the condition being sensed by the controller deviates from a desired, preselected value, an output signal from this controller 136 is selectively applied along a desired one of a pair of control lines 138 and 140, having a common return line 142, to the stepping motor 134. The cam 130 is attached to the rotating shaft 132 of the motor 134.

When the pulse stepping motor receives a signal that causes its shaft 132 and cam attached thereto to be rotated in a counter-clockwise direction to return the condition being controlled by the controller to the aforementioned, desired value, the roller 118 and the clevis 114 will be moved to the right of the position shown. This action will cause the compression spring 110 to apply a higher spring load to the connecting rod 26 and hub portion 84, 94 which are fixedly attached thereto. This increase in spring load will thus cause the flapper 82 to be moved in a direction away from its dash-line position to a more wide open position with respect to the supply nozzle 74 and against the much smaller bias of the curved leaf spring 86.

While this action takes place, it can also be seen that the upper end of the leaf spring 95, that is used to return the flapper 92 to a closed position, will be allowed to apply its force to the flapper 95 to move it to a position that is closer to the nozzle 78 and that is to the left of the dash-line position shown in the drawing.

The aforementioned increase in spring load of the compression means 110 will also simultaneously allow the flapper 92 associated with the atmospheric exhaust port 80 to be moved by the bias of the leaf spring 95 in a direction away from its dash-line position to a position that is closer to the open end of the nozzle 78.

The aforementioned simultaneous increased opening of supply nozzle 74 and the partial closing of the atmospheric exhaust and nozzle 78 will thus cause the pressure in the pilot valve chamber 100 to increase and to be applied by way of passageways 105, 106 to the fluid-actuated member 12.

It can also be seen that if the signal sent to the motor 134 is of such a characteristic that it causes the motor shaft 132 and its associated cam 130 to rotate in a clockwise direction to any one of its arcuately-displaced, stepped positions, then the roller 118 and clevis 114 will be moved to the left of the position shown, and a control action similar to that described, but in a reverse manner, will take place.

This action will cause the spring load, which the compression spring 110 is applying to the connecting rod 26, to be reduced and thus allows this rod 26 to be moved to the left of the position shown. Under these conditions, it can be seen that the lower end of the leaf spring 86, that is used to bias the flapper 82 to a closed position, will be allowed to apply its force to the flapper 82 to move it to a position that is closer to the nozzle 74 and which is to the left of the dash-line position shown in the drawing.

While the aforementioned decrease in spring load of the compression means 110 takes place, the portion of the flapper 92 shown in dash-line form will be moved to a more wide open atmospheric exhaust position with respect to the nozzle 78.

The aforementioned simultaneous increased opening of the atmospheric exhaust nozzle 78 and the partial closing of the supply nozzle 74 will thus cause the pressure in the pilot valve chamber 100 and the fluid pressure being applied to the spring-loaded, fluid-actuated member 12 by passageways 105, 106 to decrease.

The aforementioned described increase or decrease in pressure being applied to the actuator 12 will thus allow the position of the stem 14 and the valve plug 16 associated therewith to be altered. This stem motion is also simultaneously transmitted by way of the feedback structure 24 to the connecting rod 26 to reposition the flappers 82, 92 in their original positions as the flow of fluid in conduits 20 and 22 is being altered to bring the condition sensed by the controller 136 back to a desired, preselected value.

The unique digital input portion 144 of the digital-pneumatic positioner 10, shown in FIG. 1, is comprised of the elements previously identified in this specification and drawing as reference numerals 106 to 142 together with the pilot valve structure 28.

As can be seen in FIG. 2, certain of the parts 26, 28, 108, 110, 134–142 of the preferred digital portion 144a of the digital-pneumatic positioner 10a, shown in FIG. 2, are identical to the parts which have been previously referred to under the description of FIG. 1.

Although not shown in detail, it should also be understood that the pilot valve 28 is connected to the fluid pressure actuator member in the same way as the pilot valve 12, shown in FIG. 1, is shown connected to the fluid pressure actuator member 12. It should also be understood that the link 42 of the feedback structure 24, shown in FIG. 2, is connected for movement with the valve stem of the actuator in the same manner as that previously set forth under the description of the link 42 and actuator 12, shown in FIG. 1.

The digital input portion 144a, as shown in FIG. 2, differs from the digital input portion 144, as shown, in that the casing of the stepping motor in FIG. 2 is mounted on a support plate 146. This support plate 146, in turn, is fixedly connected to the left end of the pilot valve casing 72 by any suitable connecting means, such as welding material. Another difference is that the digital input portion 144a in FIG. 2 employs a linkage 148 instead of a motor-driven cam and roller 130, 128, as shown in FIG. 1, to change the spring load being introduced against the compression spring 110.

The upper end of this linkage 148 is shown in FIG. 2 to be of a forked-shaped construction at 150 and is pivotally retained on an internally-threaded member 152 by means of a pivot pin 154. The internal threads on member 152 are engaged for traversing movement along a threaded shaft member 156 to the right of the position shown, when the motor shaft 158 and clutch coupling 160 that is operably connected to the motor 134 is rotated in one direction. When the motor shaft 158 and its associated clutch 160 and the threaded shaft 156 are rotated in the opposite direction, the threaded member 152 will be moved in a direction to the right of that shown in FIG. 2.

The central portion of the linkage 148 is provided with a pin 162 for retaining the cylindrical, disc-shaped, spring-retaining member 112a in physical engagement with the left end of the spring 110.

The lower end of the linkage 148 is connected for pivotal movement with the left end of a link 164 by means of a pivot pin 166.

The right end of the link 164 is shown connected for pivotal movement to lug 168 by means of a pivotal pin connection 170. The lug 168 is fixedly connected by any suitable connecting means such as a welding material, to the support plate 146.

The support plate 146 has a first apertured wall surface 171 formed therein to accommodate the free passage of the connecting rod 26 therethrough. The support plate 146 also has another apertured wall surface 172 therein to accommodate the free passage of the motor shaft 158 therethrough.

A casing 174 is also employed to prevent dust from being brought into contact with any of the aforementioned link actuating parts 148 of the digital input portion 144a of the positioner 10a.

A pair of stops 175, 176 are also employed as shown in FIG. 2 to limit the maximum amount of travel that the central portion of linkage 148 can be moved to in the right and left directions as this linkage changes the spring load being introduced against the compression spring 110.

It can thus be seen from the aforementioned description that a digital-pneumatic positioner has been disclosed which has a pulse-to-rotating motion transducer associated with a negative feedback structure to enable a positioner to move a control member between different predeterminable positions in accordance with the number of pulses being fed into the transducer.

What is claimed is:

1. An apparatus for positioning a fluid pressure operated control member in accordance with the magnitude of a digital control signal, comprising an electro-mechanical means to transform the digital control signal into substantially proportional straight-line motion, a pilot valve having a non-restricted spring loaded flapper nozzle fluid exhaust valve and a spring loaded flapper nozzle fluid supply valve for simultaneously supplying and exhausting regulated amounts of a fluid under pressure into a common chamber, the flappers of the valve being operably connected for simultaneous opposite opening and closing movement with a connecting rod passing through the pivot valve, a first compression spring positioned between the electro-mechanical means and one end of the connecting rod for transmitting the straight-line motion in the form of a spring load to the rod, a fluid pressure actuator operably connected to apply a force proportional to the magnitude of the fluid pressure generated in the chamber by the simultaneous opening and closing of the nozzle to the controlled member, a negative feedback linkage operably connected for movement with the controlled member at one end and being operably connected at its other end to change the force applied to the end of a second compression spring, and the other end of the last-mentioned spring being operably connected to the connecting rod to transmit the motion of the feedback linkage in the form of a spring load to an opposite end of the rod to thereby balance the force being applied to the pilot valve by the first compression spring.

2. An apparatus for positioning a fluid pressure operated control member in accordance with the magnitude of a digital control signal, comprising an electro-mechanical means to transform the digital control signal into substantially proportional straight-line motion, a pilot valve to generate a fluid pressure control signal, a first compression spring positioned between the electro-mechanical means and one end of the pilot valve for transmitting the straight-line motion in the form of a spring load to the pilot valve to thereby change the magnitude of the fluid pressure control signal being generated by the pilot valve, a fluid pressure actuator operably connected to apply a force proportional to the magnitude of the fluid pressure control signal to the control member, a negative feedback linkage operably connected for movement with the control member at one end and being operably connected at its other end to change the force applied to one end of a second compression spring, and the other end of the last-mentioned spring being operably connected to the pilot valve to transmit the motion of the negative feedback linkage in the form of a spring load to an opposite end of the pilot valve to thereby balance the force being applied to the pilot valve by the first compression spring.

3. The apparatus specified in claim 2, wherein the electro-mechanical means is a pulse stepping motor driven cam and roller means.

4. The apparatus specified in claim 2, wherein the electro-mechanical means is a pulse stepping motor driven cam and roller means, and wherein the cam is constructed to move its associated roller into increasing compressed engagement with the first compressing means when the stepping motor is rotated in one direction and to move the roller into decreasing compressed engagement with the first compressing means when the motor is rotated in an opposite direction.

5. The apparatus specified in claim 2, wherein the electro-mechanical means is comprised of a pulse driven stepping motor, an associated threaded motor shaft and a two-part L-shaped linkage pivotally mounted for rotation at the right horizontal end portion thereof about a stationary pivot member and pivotally connected by means of an internally-threaded element and the upper end of its vertical portion to move the link into increasing compressed engagement with the first compression spring when the motor shaft is rotated in one direction and to move the link into decreasing compressed engagement with the first compressing spring when the motor shaft is rotated in the opposite direction.

6. An apparatus for positioning a fluid pressure operated control member in accordance with the magnitude of a digital control signal, comprising an electro-mechanical means to transform the digital control signal into substantially proportional motion, a pilot valve to generate a fluid pressure control signal, a first compression spring positioned between the electro-mechanical means and one end of the pilot valve for transmitting the motion in the form of a spring load to the pilot valve to thereby change the magnitude of the fluid pressure control signal being generated by the pilot valve, a fluid pressure actuator operably connected to apply a force proportional to the magnitude of the fluid pressure control signal to the control member, a negative feedback linkage operably connected for movement with the control member at one end and being operably connected at its other end to change the force applied to one end of a second compression spring, and the other end of the last-mentioned spring being operably connected to the pilot valve to transmit the motion of the negative feedback linkage in the form of a spring load to an opposite end of the pilot valve to thereby balance the force being applied to the pilot valve by the first compression spring.

7. An apparatus for positioning a fluid pressure operated actuating means in accordance with the magnitude of a digital control signal, comprising an electro-mechanical means to transform the digital control signal into substantially proportional straight-line motion, a pilot valve to generate a fluid pressure control signal, a first compression spring positioned between the electro-mechanical means and one end of the pilot valve for transmitting the straight-line motion in the form of a spring load to the pilot valve to thereby change the magnitude of the fluid pressure control signal being generated by the pilot valve, a fluid pressure actuator adapted to apply a force proportional to the magnitude of the fluid pressure control signal to the actuating means, a negative feedback linkage operably connected for movement with the actuating means at one end and being operably connected at its other end to change the force applied to one end of a second compression spring, and the other end of the last-mentioned spring being operably connected to the pilot valve to transmit the motion of the negative feedback linkage in the form of a spring load to an opposite end of the pilot valve to thereby balance the force being applied to the pilot valve by the first compression spring.

8. A digitally responsive apparatus, comprising a control element, a positioner operably connected to adjust the control element between any one of a number of different positions, a cam, a reversible stepping motor operably connected with the cam to transmit incremental stepping clockwise and counter-clockwise motion thereto in response to digital signals, a pilot valve, a compression spring, the compression spring being operably connected at one end with the cam to receive a loading force of increasing magnitude when the cam is rotated by the motor in one direction and to receive a loading force of decreasing magnitude when the cam is rotated in an opposite direction, and the pilot valve being operably connected for movement with the other end of the spring to control the magnitude of a fluid pressure being applied to the positioner to thereby effect a movement of the control element between said different positions.

9. A digitally responsive apparatus, comprising a control element, a positioner operably connected to adjust the control element between any one of a number of different positions, a mechnical means, a reversible stepping motor operably connected with the mechanical means to transmit incremental stepping clockwise and counter-clockwise motion thereto in response to digital signals, a pilot valve, a compression spring, the compression spring being operably connected at one end with the mechanical means to receive a loading force of increasing magnitude when the motor is rotated in one direction and to receive a loading force of decreasing magnitude when the motor is rotated in an opposite direction, and the pilot valve being operably connected for movement with the other end of the spring to control the magnitude of a fluid pressure being applied to the positioner to thereby effect a movement of the control element between said different positions.

10. A digitally responsive apparatus comprising a control element, a positioner operably connected to adjust the control element between any one of a number of different positions, a mechanical means, a reversible stepping motor operably connected with the mechanical means to transmit incremental stepping clockwise and counter-clockwise motion thereto in response to digital signals, a pilot valve, a compression spring, the compression spring being operably connected at one end with the mechanical means to receive a loading force of increasing magnitude when the motor is rotated in one direction and to receive a loading force of decreasing magnitude when the motor is rotated in an opposite direction, the pilot valve being operably connected for movement with the other end of the spring to control the magnitude of a fluid pressure being applied to the positioner to thereby effect a movement of the control element between said different positions, a negative feedback means operably connected between the control element and the pilot valve, and said feedback means being comprised of a compression spring to apply a spring load to the pilot valve in a direction that is opposite and equal to the spring load being applied by the first-mentioned compression spring.

11. A digital to analog transducer, comprising a fluid pressure regulator, a follower, a biasing means positioned between the regulator and the follower, an electro-mechanical means having a rotary output force-generating cam member operably connected by way of the follower to urge the biasing means against the regulator to thereby transmit a mechanical control force thereto and alter the magnitude of a fluid control signal produced thereby in accordance with the magnitude of a digital signal, a fluid responsive means operably connected to respond to changes occurring in the magnitude of the control signal and a negative feedback means including a spring operably connecting the fluid responsive means to the regulator to balance the force being applied thereto.

References Cited by the Examiner

UNITED STATES PATENTS

| | | | |
|---|---|---|---|
| 2,291,048 | 7/1942 | Lichtenstein. | |
| 2,473,572 | 6/1949 | Cooper et al. | 91—37 |
| 2,601,511 | 6/1952 | Gaffney. | |
| 2,634,747 | 4/1953 | Markson. | |
| 2,865,338 | 12/1958 | Judge | 91—37 |
| 2,911,953 | 11/1959 | Killian. | |
| 2,966,891 | 1/1961 | Williams. | |
| 3,031,840 | 5/1962 | Hegg et al. | |
| 3,051,139 | 8/1962 | Thorner. | |
| 3,055,225 | 9/1962 | Miller | 251—251 X |
| 3,065,736 | 11/1962 | Demay. | |

FOREIGN PATENTS 620,688 3/1949 Great Britain.
82,841 3/1935 Sweden.

SAMUEL LEVINE, *Primary Examiner.*

FRED E. ENGELTHALER, *Examiner.*